(12) United States Patent
Graham

(10) Patent No.: US 7,062,492 B1
(45) Date of Patent: Jun. 13, 2006

(54) REMOTE WEB SITE AUTHORING SYSTEM AND METHOD

(75) Inventor: Paul Graham, Cambridge, MA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 10/414,445

(22) Filed: Apr. 14, 2003

Related U.S. Application Data

(63) Continuation of application No. 10/038,285, filed on Jan. 2, 2002, now Pat. No. 6,581,061, which is a continuation of application No. 08/799,915, filed on Feb. 13, 1997, now Pat. No. 6,343,302.

(51) Int. Cl.
*G06F 17/30* (2006.01)
*G06F 15/00* (2006.01)

(52) U.S. Cl. ............ 707/10; 715/501.1; 715/513
(58) Field of Classification Search ........... 707/10; 715/501.1, 513
See application file for complete search history.

(56) References Cited

U.S. PATENT DOCUMENTS

| | | | |
|---|---|---|---|
| 5,724,595 A | 3/1998 | Gentner | |
| 5,727,156 A | 3/1998 | Herr-Hoyman et al. | |
| 5,732,219 A | 3/1998 | Blumer et al. | |
| 5,761,663 A | 6/1998 | Lagarde et al. | |
| 5,802,530 A | 9/1998 | Van Hoff | |
| 6,012,071 A | 1/2000 | Krishna et al. | |
| 6,343,302 B1 | 1/2002 | Graham | |
| 6,581,061 B1 | 6/2003 | Graham | |
| 6,760,903 B1 * | 7/2004 | Morshed et al. ............ | 717/130 |

OTHER PUBLICATIONS

Johnson, R. Colin, "WYSIWYG for the Web . . . ", *Electronic Engineering*, 877:132-(1995).

* cited by examiner

*Primary Examiner*—Alford W. Kindred
(74) *Attorney, Agent, or Firm*—Morrison & Foerster LLP

(57) ABSTRACT

A remote web site authoring system is located on a server in communication with one or more clients via a network with in a distributed computing environment. The system provides a what-you-see-is-what-you-get (WYSIWYG) interface program that enables the client to edit a web page of within a web site maintained on the remote server while concurrently viewing a replica of that web page. The system dynamically generates the replica of the web page while the client is editing the web page. The system combines the two elements of remote authoring, i.e., editing the web site and viewing the web site, enabling the user to view a replica of the web site during the editing process.

18 Claims, 6 Drawing Sheets

REMOTE WEB SITE AUTHORING SYSTEM AND METHOD

CROSS REFERENCE TO RELATED APPLICATION

This application is a continuation for U.S. patent application Ser. No. 10/038,285, filed Jan. 2, 2002, now U.S. Pat. No. 6,581,061, which is continuation of application Ser. No. 08/799,915, filed Feb. 13, 1997, now U.S. Pat. No. 6,343,302, issued on Jan. 29, 2002, which are both incorporated herein by reference.

FIELD OF THE INVENTION

The invention relates to remote authoring of web pages. In particular, the invention is a system and method for what-you-see-is-what-you-get (WYSIWYG) authoring of web pages using ordinary web pages as the interface.

BACKGROUND OF THE INVENTION

A web site is a source of stored or dynamically generated web pages. Web pages consist of ascii text and are expressed in a formal language known as HyperText Markup Language (html). Web pages are usually sent from one machine (the server) to another (the client). The two machines may be the same, but ordinarily they are separate machines that communicate via a network.

The term "server" can mean both the physical machine that is sending web pages, and the software on the machine that responds to requests for pages. Where it is necessary to distinguish, the term "web server" is used herein for the former.

The client requests a web page from the server using a Universal Resource Locator (url). A url has three parts: the protocol by which the client wants to talk to the server, the name of the server, and a third part, which is called the "request", that indicates what the client wants the server to send it.

Here is an example of a url expressed in a form commonly used today: http://www.foo.com/bar.html. In this url, http indicates the protocol by which the client wants the request sent to the server. www.foo.com is the name of the server to which the request is to be sent. bar.html is the request that is to be sent to the server.

Most servers would interpret "bar.html" as a request for an html file stored on disk, and would respond by reading the file and sending it to the client. But how to respond to a request is entirely up to the server. A server could equally well choose to interpret "bar.html" as a request for a web page containing the current time.

A web page usually contains some amount of text plus html operators specifying how to display the page on the screen. The client software (e.g. a browser) has considerable leeway in deciding how to display the page to the user. The aspect of the display of web pages relevant to the invention is the display of links and forms.

A link is usually a combination of text and/or an image, plus a url. Typical client software will display the text or image with an underline or outline, or some other indication that the text is active. The user can indicate that he wants to follow that link, usually by clicking on it with a mouse. Herein the phrase "to click on a link" refers to a general term to mean whatever method the user uses to indicate that he wants to follow a link.

When the user clicks on a link, the request in the associated url is sent to the web server mentioned in that url. Usually the request will cause the server to send the client another web page, which will in turn contain other links, resulting in an ongoing series of requests from the client interleaved with web pages sent in reply by the server(s).

A form is like a link in that it includes places (i.e. "buttons") where the user can click to send a request to a server, but it can also include "fields", through which the user can send additional information along with the request. For example, a form field might be a menu of choices, a box in which the user can type text, or a button that the user can toggle on or off.

Herein the phrase "client software capable of browsing a conventional web site" means software able to: (1) display web pages in some form to the user; (2) display links so that the user can click on them to send the corresponding request to the server named in the url; (3) display forms so that the user can enter information into each field, and click on some button to send the corresponding request, plus the information entered by the user, to the server named in the url; and (4) carry on an ongoing dialogue with a server, where requests from the client alternate with web pages from the server.

Herein the term "link" includes both links and forms, along with any other element of a web page that has an associated url, and which a user can click on to send the request in the url to the server mentioned there.

Two elements are required to publish web pages on the Internet or on an intranet:
(1) an authoring tool: software for creating and maintaining the web pages; and (2) a server: a computer that can send (or "serve") the web pages to clients who request them. To avoid the expense and difficulty of maintaining their own web servers, users often share servers maintained by someone else. On the Internet, a company that maintains a web server shared by multiple users is called a hosting service. Within a corporate network, a server maintained by the MIS department might play the role of a hosting service for users within the company.

A shared server is not usually at the same location as the user. There are two general ways for a user to create and maintain a web site on such a remote server: (1) the user can use an authoring tool that runs on his own local machine, and then transmit the finished site (or perhaps just changes) to the server; or (2) the user can use an authoring tool that runs on the remote server, sending commands to it over the network. Herein the term "remote authoring" refers to the second case. In remote authoring, the user's local machine is nothing more than an interface. Commands are sent over the network, and executed on the remote server.

The advantages of remote authoring derive from the fact that very little happens on the local machine. For example, no software has to be installed on the local machine if it can already browse web pages. This is an attraction in itself to end users, and it also means that the user is not tied to using any particular computer. Any computer with a browser and a network connection to the server will do. This might include a computer so simple that it is not possible for the user to install software on it: for example, a web-enabled television set.

There are also advantages in reliability. The data for the site is stored on the server, rather than the user's machine. Servers are generally more reliable than clients, because servers are shared, and there is more at stake if they fail.

Remote authoring of web pages requires two major pieces of software: (1) some kind of database in which the information to be presented in the web site is stored; and (2) a program that generates web pages from information contained in the database. Known remote authoring tools require the user to use these two programs separately. The user would add or change information via the database program, then in a second step, visit and inspect the modified site. The disadvantage of this approach is that the user cannot see the site as he is modifying it.

The configuration of the software on a typical web server is as follows. Client requests are handled by the server, and can be of two types: (1) a request for a particular html file, in which case it reads the file off the disk and sends it to the client; or (2) a request to run a program that yields a web page as a result (a cgi script), in which case it invokes the program and returns whatever web page it generates. The second case is the one that is relevant to remote authoring. In this configuration, the server does little more than relay requests to a collection of predefined programs.

Known remote authoring tools are implemented in terms of scripts. With reference to FIG. 1, the following is an example of how a programmer might build a remote interface to a database, using a cycle of three cgi scripts, called Sselect, Sdisplay, and Supdate.

In step 10, the user initiates the cycle by sending a request to the server to run Sselect. The server calls Sselect. In step 12, Sselect generates an html form that lets the user select a database entry to edit (e.g. a menu of the possible choices), with an "Edit" button whose url contains a request for Sdisplay. In step 14, the server sends this page to the client, where it is displayed to the user. In step 16, when the user clicks on "Edit", the server receives the request from the button that the user clicked on (Sdisplay) along with the name of the entry the user selected. The server then passes that name to Sdisplay. In step 18, Sdisplay reads the entry selected by the user from the database, and generates an html form with fields representing the current value of each part of the entry, plus an "Update" button whose url has Supdate as its request. In step 20, the server sends this page to the client, where it is displayed to the user. In step 22, when the user clicks on "Update", the server receives a request for Supdate, along with possibly modified values for each field in the entry the user selected. The server passes this information on to Supdate. In step 24, Supdate writes the new information to the corresponding entry in the database, then calls Sselect, and the process returns to step 10.

The foregoing represents the state of the art for known remote web site authoring tools. After modifying the contents of the database, the user can view the updated site. But the interface, while editing the site, is that of a database program.

SUMMARY OF THE INVENTION

Generally, the invention features a system and method for creating web pages in which ordinary web pages are the interface to the user, and more particularly, web pages representing the site being created by the user. The invention combines the two elements of remote authoring: i.e. editing the site and viewing the site. The interface that the user sees while editing the site is a version of the site itself, reflecting all changes to date.

While the general concept of an authoring tool running on a remote server is known, the invention enables the user to do remote authoring via a "what-you-see-is-what-you-get" (WYSIWYG) interface. Known remote authoring tools provide the user with a database interface while editing a web site. In contrast, the invention allows the user to see the site as he is editing it.

WYSIWYG software for desktop computers has existed for many years. However, developing WYSIWYG remote authoring software for web pages poses difficulties that do not arise for software that can communicate directly with the operating system of the user's machine: (1) the interface that the authoring software can display to the user is limited to what you can express using web pages, and (2) the commands sent by the user to the authoring software are limited by the requests that can be sent from a web page to the server. The invention provides a way to do WYSIWYG authoring in spite of these difficulties.

The invention features a system (and method) for remote authoring where web pages representing the site being created are generated dynamically by the server. Each link generated by the server contains a unique key, and at the time the server generates the link, it also generates a program that is to be executed if the user clicks on that link. The program is stored in a table within the server, indexed under the corresponding key. When the user clicks on a link, the key is extracted from the request sent to the server, which retrieves and executes the program stored in its table under that key.

When executed, the program will usually generate and send to the user a new web page, and generate and store within the server new programs for each link on the page. So the code executed by the server as it responds to several successive clicks will consist of a sequence of programs, each generated by the preceding one.

DETAILED DESCRIPTION

Figure 1:
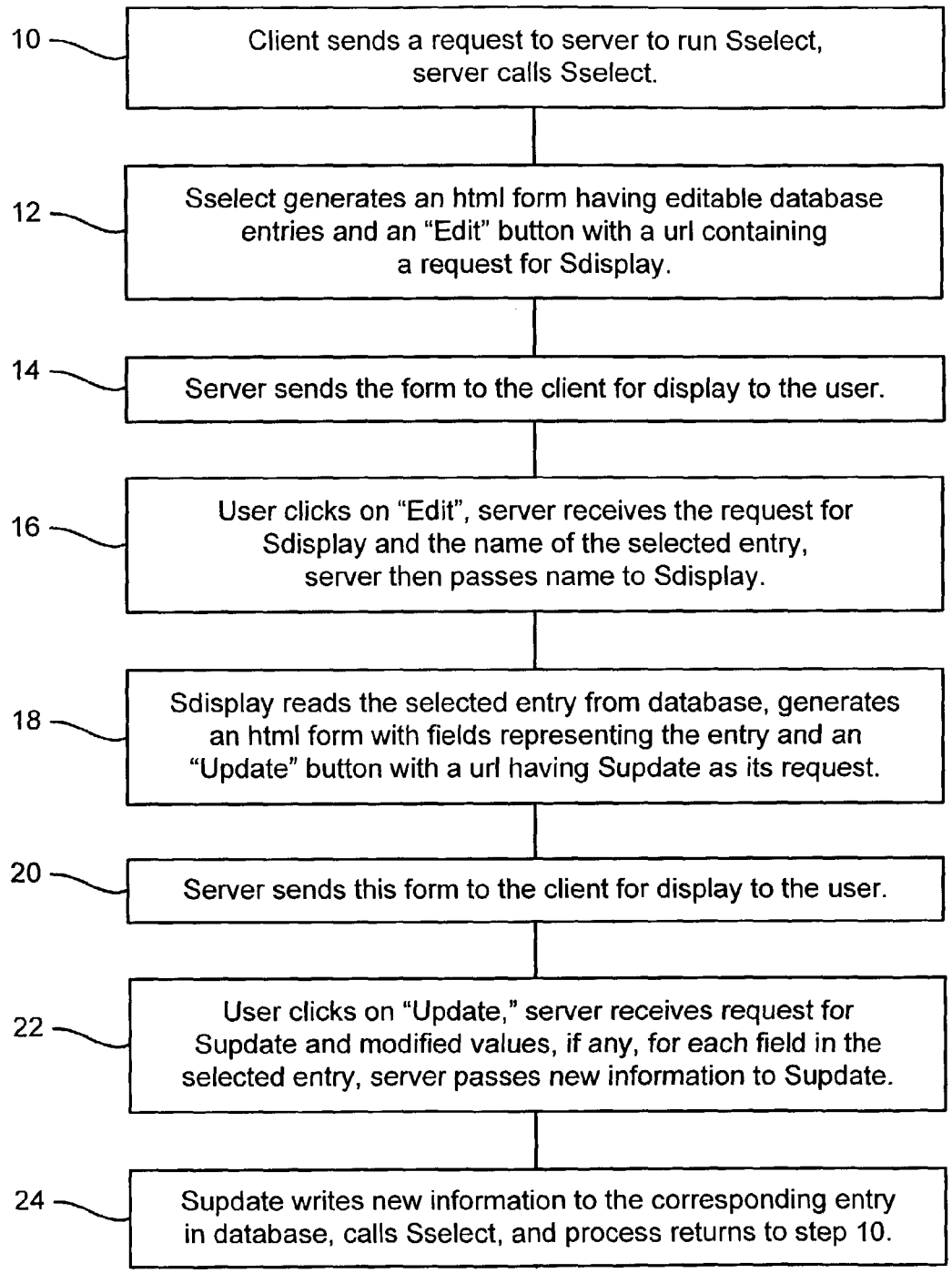
FIG. 1 is a flow chart illustrating a known remote authoring method.
Figure 2A:
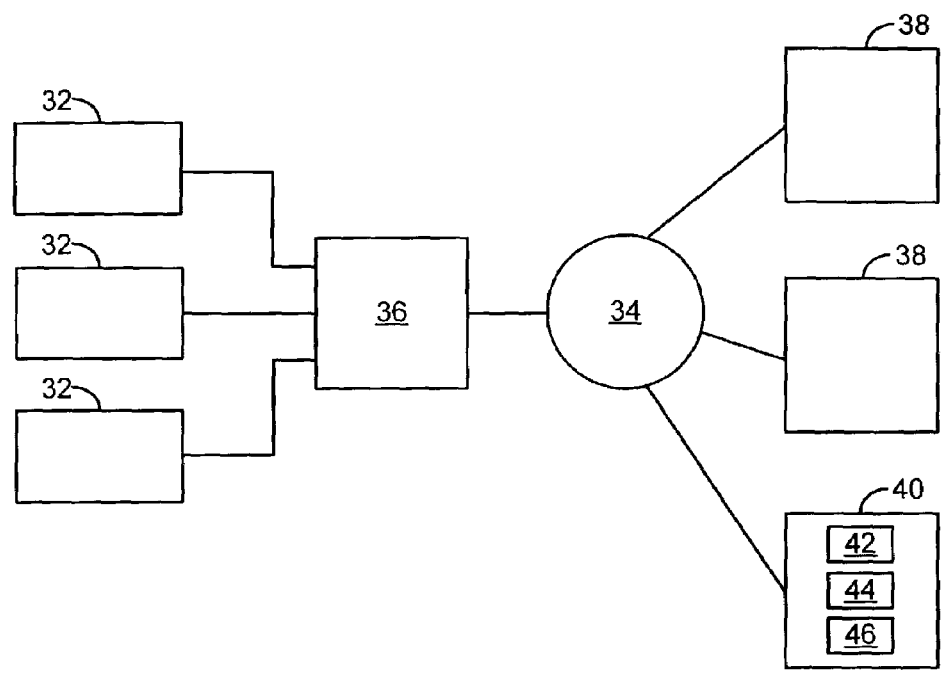
FIG. 2A is a block diagram of a distributing computing system incorporating the principles of the invention.

Referring to FIG. 2A, a distributed computing environment 30 includes clients 32 (e.g., a computer, fax machine, web-enabled television) are connected to the Internet 34 (or to an intranet) via a network service provider 36. A users can manipulate a client 32 via a user interface (not shown). Each client 32 can communicate with other clients or with web servers 38, 40 (e.g., game sites, video sites, corporate sites, libraries, electronic publishing) through the network service provider 36. The web server 40 includes a remote WYSIWYG authoring program 42 and a database 44.

Figure 2B:
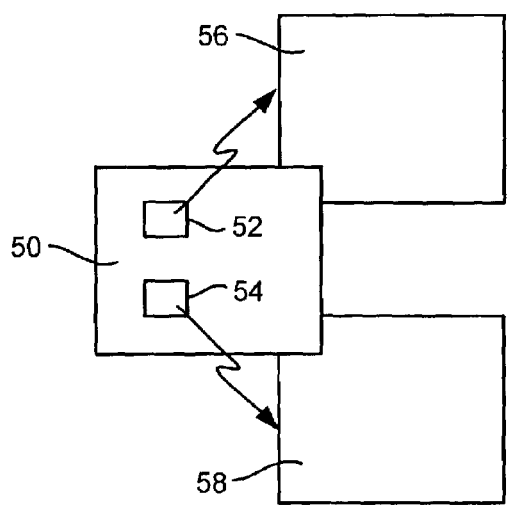
FIG. 2B is an illustration of the front page and additional pages of a web site created and maintained in accordance with the principles of the invention.

To make remote WYSIWYG authoring work, the server 42 does not use cgi scripts. Instead of using a server that passes requests on to one of a set of predefined, independent cgi scripts, the server 40 processes all incoming requests itself. Referring to FIG. 2B, when a user first logs in, the server sends a replica 50 of the front page of his/her web site to the client. If the site contains additional pages, the user can click on links 52, 54 and get replicas 56, 58 of the corresponding pages. Thus, the user can traverse the site just as he/she would traverse a collection of ordinary, static html pages. While these pages look just like the regular static html pages, they are actually generated dynamically by the server 40. Similarly, the links on each page, instead of containing requests for html files or predefined cgi scripts, contain requests for programs generated by the server 40 as it is sending the page to the client 32.

For each link on each page it generates, the server 40 generates a program that is to be executed if that link is the one clicked on by the user. The programs are stored in a table 46 within the server 40 and indexed under a unique key. The request of the link includes the key. When the user clicks on a link, the key is part of the request sent to the server 40. The server then retrieves the program associated with that key and executes the program. When executed, this program will almost always clear the server's internal table, and then send the user another dynamically generated html page, containing urls whose requests are the keys of a new set of programs generated dynamically. So if you look at the code executed by the server as it responds to several successive clicks, it consists of a sequence of programs, each generated by the preceding one.

Because the program associated with each link is generated as the server sends the page containing the link to the user, the server is not limited to a predefined set of cgi scripts. At any time, the server can generate a link that will result in an action of its choosing.

In accordance with the invention, the server handles all incoming requests itself, instead of passing requests on to one of a set of predefined, independent cgi scripts. When the remote user first logs in, the first thing the server sends him is a facsimile of a page (usually the front page) of his site. If the site contains additional pages, the user can click on links to them, and get a facsimile of the corresponding page. So the user can traverse the site just as he would traverse a collection of ordinary, static html pages.

Figure 3:
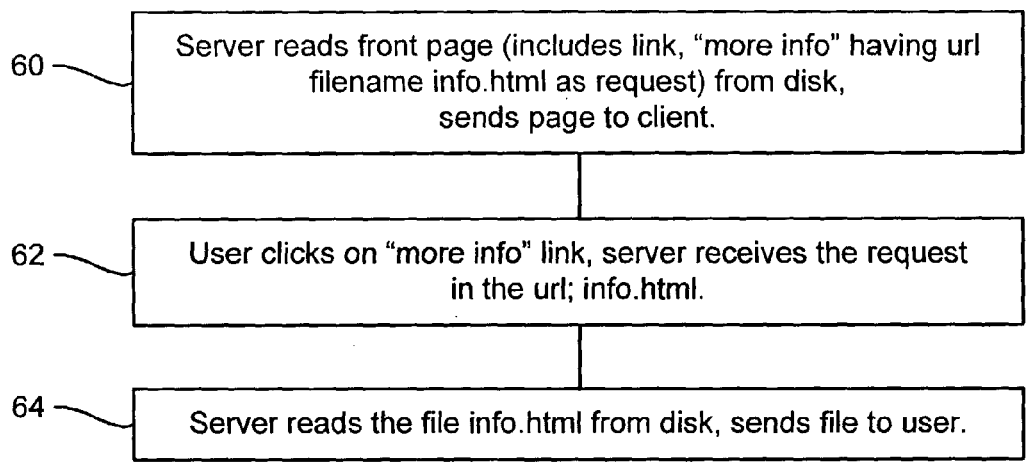
FIG. 3 is a flow chart illustrating a known method of navigating a web site in a distributing computing system.
Figure 4:
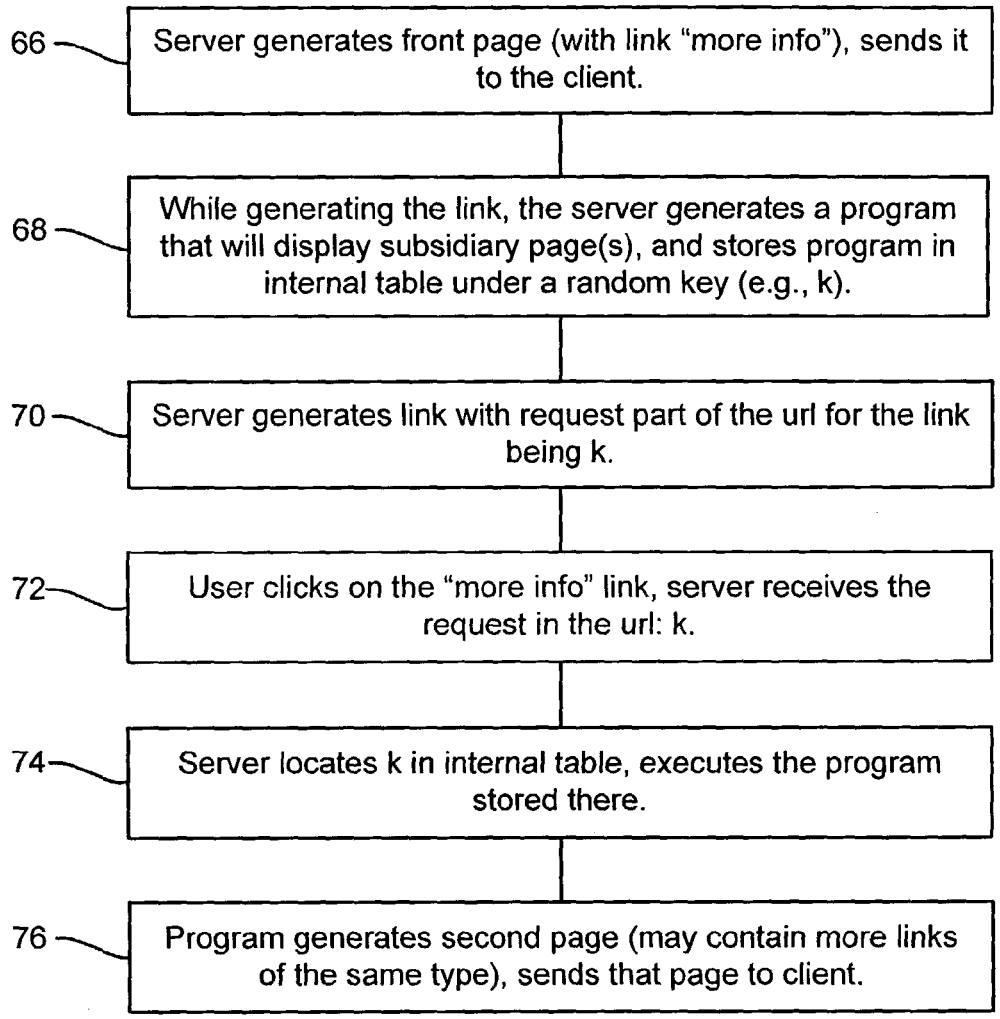
FIG. 4. is a flow chart illustrating a method of navigating a dynamically generated replica of a web site in a distributing computing system incorporating the principles of the invention.

To illustrate the invention, the following is a comparison of what happens when a user navigates an ordinary static web site (FIG. 3), and when a user navigates a dynamically generated replica of his site using the server 42 (FIG. 4). Assume, for example, a simple web site consisting of a front page with a link, designated as "more info," to a subsidiary page.

With reference to FIG. 3, the navigation process is as follows. First, the server reads the front page from disk and sends it to the user (step 60). On the front page is a link whose text reads "more info", and whose url has a filename, e.g. info.html, as the request. Second, when the user clicks on the "more info" link, the server receives the request in the url: info.html (step 62). Third, the server reads the file info.html from disk and sends it to the user (step 64).

With reference to FIG. 4, the navigation process using the invention is as follows. First, the server generates the front page and sends it to the user (step 66). On the page is a link whose text reads "more info." Second, while generating this link, the server generates a program that will display the subsidiary page, and stores it in its internal table under a unique key (e.g., k) (step 68). Third, the server then generates the link so that the request part of the url is k (step 70). Fourth, when the user clicks on the "more info" link, the server receives the request in the url: k (step 72). Fifth, the server looks up k in its internal table, and executes the program found there (step 74). Finally, that program generates a second page (possibly containing more links of the same type) and sends it to the user (step 76).

To the user, the sequence of events for the two methods could look the same. An advantage of the invention is that the pages sent to the user can contain links that cause any code to be executed, not just code that leads to another page. For example, links can be associated with code that modifies the site in some way.

The capability of links to cause any code to be executed is the key to combining site viewing and site modification and, thus, yield a WYSIWYG authoring program. Along with links that are intended to be part of the finished web site (for example, links for navigation), the pages can have other links used for editing the site. These links can be positioned on the page to distinguish them from the content of the page itself. The same mechanism, however, is used for all links.

Figure 5:
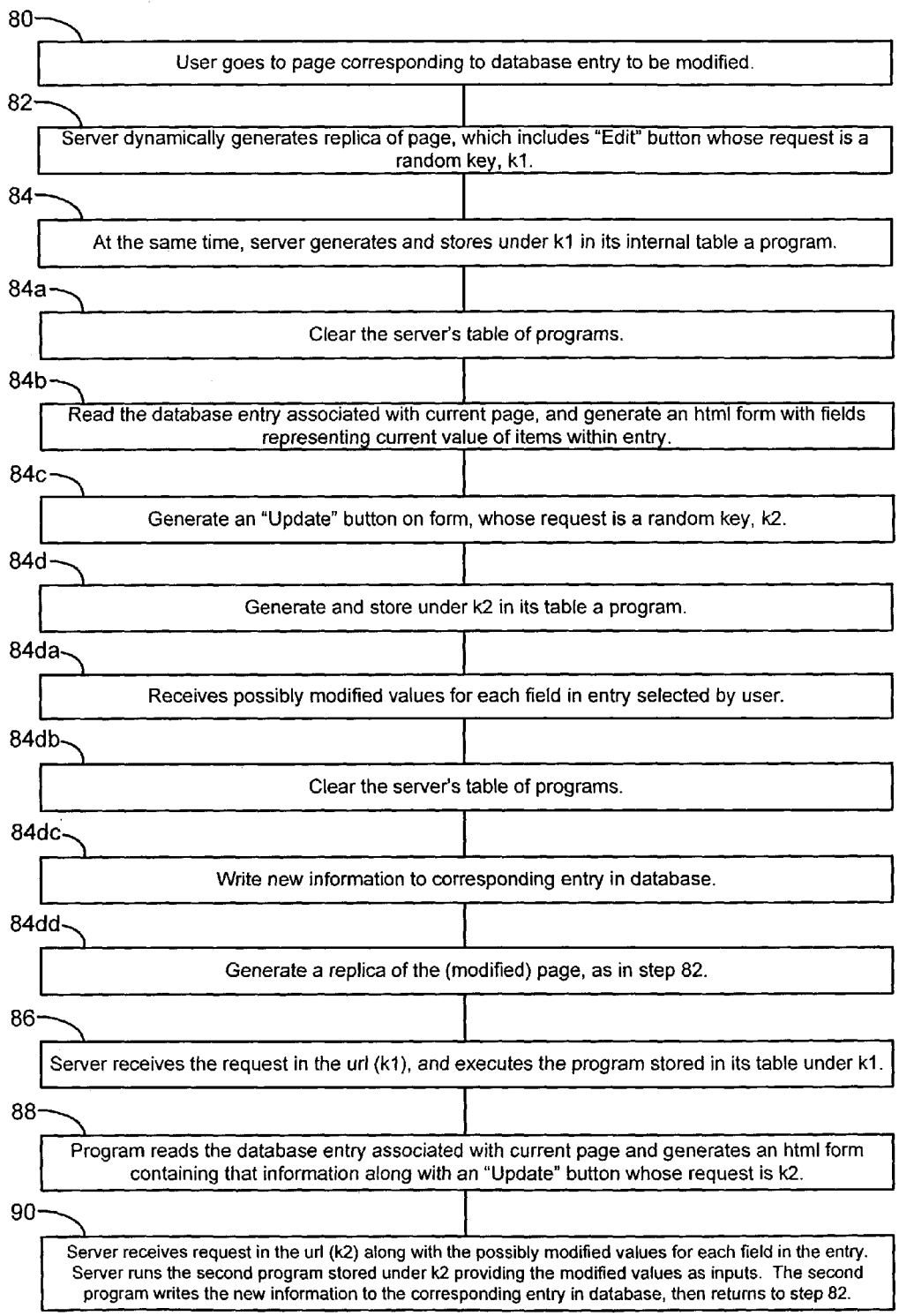
FIG. 5 is a flow chart illustrating a remote WYSIWYG authoring method incorporating the principles of the invention.

By way of example, the "Edit" button that was part of a database interface in known remote authoring approaches can now be put on the page representing the object to be edited. Referring to FIG. 5, the WYSIWYG authoring program edits a site in the following manner. First, the user begins by going to the page corresponding to the database entry he wants to edit (step 80). Second, the server dynamically generates a replica of that page (step 82). Somewhere on it, the server generates an "Edit" button whose request is a unique key, say k1. Third, at the same time, the server generates and stores under k1 in its table a program (step 84). If executed, the program will:

1. Clear the server's table of programs (step 84a).
2. Read the database entry associated with the current page, and generates an html form with fields representing the current value of each part of the entry (step 84b).
3. Somewhere on the form, generate an "Update" button whose request is a unique key, say k2 (step 84c).
4. Generate and store under k2 in its table a new program (step 84d). If executed, this program will:
   a. Expect as input the possibly modified values for each field in the entry the user selected (step 84da).
   b. Clear the server's table of programs (step 84db).
   c. Write the new information to the corresponding entry in the database (step 84dc).
   d. Generate a replica of the modified page (step 84dd).

Fourth, when the user clicks on "Edit," the server receives the request in the url, k1, and executes the program stored in its table under that key (step 86). Fifth, the program reads the database entry associated with the current page and generates an html form containing that information and an "Update" button whose request is k2 (step 88). Sixth, when the user clicks on Update, the server receives the request in the url, k2, along with the possibly modified values for each field in the entry (step 90). The server runs the new program stored under k2 in its table, giving it the modified values as input. Finally, the new program (as specified in step 84d) writes the new information to the corresponding entry in the database, then returns to step 82. Because the page sent to the user in step 82 is dynamically generated, it will reflect the user's recent changes.

Note that in applicant's approach, there are no predefined cgi scripts. The server generates the program to be executed for each url as it generates the url. Moreover, that program can specify what future programs should be written for several successive interactions with the user. In the previous example, the first program to be generated (k1) specified how the second (k2) was to be generated, should the user click on the "Edit" button. Because the second program (k2) was generated within the first program, it had access to all its variables and data structures which are needed to for the second program to know what to do after updating the database. One item that the second program has to know is what page of the site was being displayed when the user clicked on "Edit." That information, along with all other data available in step 82, is available to the second program.

This approach is in contrast to known methods involving cgi scripts, which are independent programs and can only communicate with one another to the extent that one cgi script explicitly stores information somewhere (e.g. in a database) for a later cgi script to read.

The previous example (FIG. 5) could give the impression that interacting with the user always involves a loop that returns back to the same page in the site. However, this is not the case if the page generated in step 82 contains a "Delete" button as well as an "Edit" button. The request of the "Delete" button would also contain a key (e.g., k3), and step 84 would also include the following steps.

Figure 6:
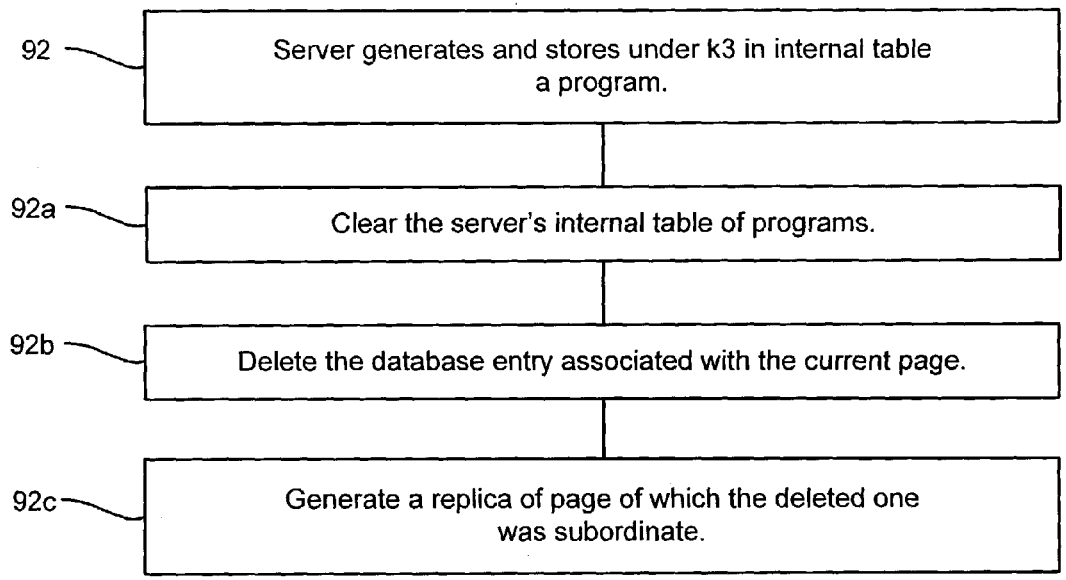
FIG. 6 is a flow chart illustrating the steps associated with deleting information from a web page using the remote WYSIWYG authoring method incorporating the principles of the invention.

Referring to FIG. 6, the server generates and stores under k3 in its table a program (step 92). If executed, the program will:

1. Clear the server's table of programs (step 92*a*).
2. Delete the database entry associated with the current page (step 92*b*).
3. Generate a replica of the page that the deleted one was subordinate to, as in step 82 (step 92*c*).

One advantage of generating a program for each link dynamically is that links can do different things depending on some kind of context. In FIG. 4, the url of the "more info" link contains a request for a program that will generate the second page of the site. However, the user might not always want the "more info" link to perform that function. Along with "Edit" and "Delete" buttons, the user might want to have a "Move" button that would allow the him/her to rearrange the elements on the page. The program associated with the "Move" button might generate a version of the current page in which each link was associated not with a program that led to the corresponding page, but with a program that selected the corresponding page element as the one to be moved.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

The invention claimed is:

1. A method of interacting in a distributed computing environment between a client and a remote server over a network, comprising:
  receiving, at the server, at least one request from the client for a web page of a plurality of web pages maintained on the server; providing a dynamically generated web page for display by the client, generated by the server, to the client; dynamically generating program steps for the web page; providing a link located on the dynamically generated web page that enables the client to initiate an action, wherein the link is configured to include a reference to the dynamically generated program steps; storing the program steps in a database, the program steps being retrievable from the database using the reference; receiving, from the client, a request that includes the reference, based on the selection of the link; retrieving the program steps from the database using the reference; and executing the program steps to generate a form that allows the user to edit the web page, the form including a second link to dynamically generated second program steps, wherein the second link is configured to include a reference to the dynamically generated second program steps; receiving, from the client, a second request that includes the second reference and edits to the web page; and executing the second program steps to update the web page with the edits.

2. The method of claim 1, further comprising providing the updated web page to the client while the client is editing the web page.

3. The method of claim 1 wherein the link located on the dynamically generated web page that, when selected by the user, enables the client to edit the web page.

4. The method of claim 3 wherein the program steps allow the client to edit the web page.

5. The method of claim 4 further comprising:
  executing the program steps to allow the user to edit the web page, wherein the dynamically generated subsequent web page includes the edits.

6. The method of claim 5 wherein executing the program steps comprises:
  reading a database entry associated with the web page; and
  generating the form with fields representing current values of each part of the entry.

7. A system for interacting in a distributed computing environment between a client and a remote server over a network, comprising:
  logic to receive, at the server, at least one request from the client for a web page of a plurality of web pages maintained on the server;
  logic to provide a dynamically generated web page for display by the client, generated by the server, to the client;
  logic to dynamically generate program steps for the web page;
  logic to provide a link located on the web page that enables the client to initiate an action, wherein the link is configured to include a reference to the dynamically generated program steps;
  logic to store the program steps in a database, the program steps being retrievable from the database using the reference;
  logic to receive, from the client, a request that includes the reference, based on the selection of the link;
  logic to retrieve the program steps from the database using the reference; and
  logic to execute the program steps to generate a form that allows the user to edit the web page, the form including a second link to dynamically generated second program steps, wherein the second link is configured to include a reference to the dynamically generated second program steps;
  logic to receive, from the client, a second request that includes the second reference and edits to the web page; and
  logic to execute the second program steps to update the web page with the edits.

8. The system of claim 7, further comprising logic to provide the updated web page to the client while the client is editing the web page.

9. The system of claim 7 wherein the link located on the web page that, when selected by a user, enables the client to edit the web page.

10. The system of claim 7 wherein the program steps generated by the interface allows the client to edit the web page; and further comprising a table for storing the program in a table under the link.

11. The system of claim 7 wherein the server, upon the selection of the link by a user, uses the link to retrieve the program stored in the table, executes the program to allow the user to edit the web page.

12. The system of claim 7 wherein the server uses dynamically generated programs to allow the user to edit the web page without the use of cgi scripts.

13. A method of interacting in a distributed computing environment between a client and a remote server over a network, comprising:

receiving, from the client, a request to edit a web page that includes a reference, based on the selection of a link;

retrieving program steps that were dynamically generated for the web page from a database using the reference;

executing the program steps to generate a form that allows the user to edit the web page, the form including a second link to dynamically generated second program steps, wherein the second link is configured to include a reference to the dynamically generated program steps;

receiving, from the client, a second request that includes the second reference and edits to the web page; and executing the second program steps to update the web page with the edits.

14. The method of claim 13, further comprising:

accessing a database entry for the web page, wherein the form includes fields for editing parts of the entry.

15. The method of claim 13, wherein executing the second program steps to update the web page with the edits comprises updating a database entry for the web page with the edits.

16. The method of claim 13, wherein executing the second program steps to update the web page with the edits comprises generating an updated web page with the edits.

17. The method of claim 16, further comprising providing the updated web page including the edits to the client.

18. The method of claim 13, wherein executing the second program steps comprises:

storing the edits to the corresponding entry in the database.

* * * * *